United States Patent [19]
Wilcox et al.

[11] Patent Number: 5,847,554
[45] Date of Patent: Dec. 8, 1998

[54] SYNCHRONOUS SWITCHING REGULATOR WHICH EMPLOYS SWITCH VOLTAGE-DROP FOR CURRENT SENSING

[75] Inventors: Milton E. Wilcox, Saratoga; Christopher B. Umminger, Sunnyvale, both of Calif.

[73] Assignee: Linear Technology Corporation, Milpitas, Calif.

[21] Appl. No.: 878,631

[22] Filed: Jun. 13, 1997

[51] Int. Cl.$^6$ ........................................ G05F 1/563
[52] U.S. Cl. ................................ 323/282; 323/351
[58] Field of Search ........................ 323/265, 282, 323/283, 284, 285, 351, 271

[56] References Cited

U.S. PATENT DOCUMENTS

| | | | |
|---|---|---|---|
| 4,823,070 | 4/1989 | Nelson | 323/285 |
| 5,414,341 | 5/1995 | Brown | 323/268 |
| 5,479,090 | 12/1995 | Schultz | 323/284 |
| 5,552,695 | 9/1996 | Schwartz | 323/271 |

OTHER PUBLICATIONS

*LTC1148/LTC1148–3.3/LTC1148–5 High Efficiency Synchronous Step–Down Switching Regulators* (data sheet), Linear Technology Corporation, Milpitas, CA (1993).

*Si9150 Synchronous Buck Converter Controller* (data sheet), Siliconix Incorporated, Santa Clara, CA (Apr. 1994).

*LTC1430 High Power Step–Down Switching Regulator Controller* (data sheet), Linear Technology Corporation, Milpitas, CA (1995).

*MAXIM Step–Down Controllers with Synchronous Rectifier for CPU Power* (data sheet), Maxim Integrated Products, Inc., Sunnyvale, CA (Apr. 1996).

*LTC1435 High Efficiency Low Noise Synchronous Step–Down Switching Regulator* (data sheet), Linear Technology Corporation, Milpitas, CA (1996).

*Primary Examiner*—Adolf Berhane
*Attorney, Agent, or Firm*—Fish & Neave; Robert W. Morris; Garry J. Tuma

[57] ABSTRACT

Synchronous switching regulator circuits with voltage-drop sensing circuitry are presented in which the current sensing element typically in series with a load is eliminated, resulting in reduced dissipative losses and less costly manufacture. Voltage drops are measured across the regulator's synchronous switching element, and, in some cases, also across the regulator's main switching element. Measured voltage drops are used to derive a current analog signal indicative of the amount of current being supplied by the regulator. The current signal is then compared with a threshold value to determine whether the regulator's duty cycle should be varied.

30 Claims, 6 Drawing Sheets

Content continues.

SYNCHRONOUS SWITCHING REGULATOR WHICH EMPLOYS SWITCH VOLTAGE-DROP FOR CURRENT SENSING

BACKGROUND OF THE INVENTION

This invention relates to switching regulator circuits. More particularly, this invention relates to current sensing in synchronous switching regulator circuits.

Switching regulator circuits provide loads with a predetermined and substantially constant output voltage from a source voltage which may be poorly-specified or fluctuating. Such regulators usually employ a switch, which includes one or more switching elements coupled in series or in parallel with the load; switching elements may be, for example, power MOSFETs. Control circuitry regulates the amount of current supplied to a load by varying the ON-OFF times of the switching elements (i.e., the duty cycle of the regulator, which is the percentage of time that a switch is ON during a cycle of operation). Inductive energy storage elements are typically used to convert the switched current pulses into a steady flow of load current.

Synchronous switching regulators have at least two switching elements, a main switching element and a synchronous switching element, which are driven out of phase with respect to each other to supply current at a regulated voltage to a load. Synchronous switching regulators that employ power MOSFET (metal oxide semiconductor field-effect transistor) switches are widely used in portable battery-powered electronic products and products in which only limited heat generation can be tolerated. These regulators power the various electronic functions by converting the typically fluctuating input voltage to a regulated output voltage. Such regulators provide high operating efficiency and thus long battery life with little heat generation.

Synchronous switching regulators that operate in current-mode are particularly desirable because they provide good line and load transient signal rejection and inherent current-limiting capabilities during fault conditions (e.g., output short circuits). Current-mode synchronous switching regulators typically monitor the inductor current to determine when to turn the main switching element OFF and the synchronous switching element ON during each cycle of operation.

FIG. 1 shows a prior art current-mode synchronous step-down switching regulator 100 that uses a current sensing element, e.g., current sense resistor 102, to monitor inductor current. Regulator 100 is typically used for DC-to-DC conversion of an unregulated supply voltage $V_{IN}$ (e.g., a battery) to a regulated output voltage $V_{OUT}$, for driving a load $R_L$, which, while simply shown as a resistor, may be, for example, a portable communication device or a computer.

Regulator 100 operates typically as follows: at the beginning of a cycle, oscillator 104 sets latch 106 causing driver 108 to turn ON main switch MOSFET 110 and causing driver 112 to turn OFF synchronous switch MOSFET 114. This results in a voltage of approximately $V_{IN}-V_{OUT}$ across inductor 116, which increases current through inductor 116. Inductor current $I_L$ flows through sense resistor 102 creating a differential sense voltage $V_{SENSE}$, equal to the product of $I_L$ and sense resistor 102. When $V_{SENSE}$ exceeds the voltage across threshold-setting resistor 118, current comparator 120 trips and resets latch 106, which then causes driver 108 to turn OFF MOSFET 110, and driver 112 to turn ON MOSFET 114. This changes the voltage across inductor 116 to approximately $-V_{OUT}$, causing inductor current $I_L$ to decrease until the next oscillator pulse sets latch 106.

The threshold voltage across resistor 118 is set by the loop comprised of output resistor divider 122, error amplifier 124, compensation components 126 and 128, and voltage-to-current converter circuitry 130, 132, and 134. If the load current at $V_{OUT}$ increases, the resulting voltage drop at the inverting input of error amplifier 124 causes the outputs of error amplifier 124 and voltage-to-current converter circuitry 130 to increase, turning on transistor 132 and increasing the threshold voltage across resistor 118. Conversely, if the load current at $V_{OUT}$ decreases, the threshold voltage across resistor 118 decreases. Thus the threshold of current comparator 120 is continuously adjusted such that the average inductor current matches the load current.

If an output short circuit occurs in regulator 100 (e.g., $R_L$ is shorted to ground), the current is limited to a value set by the maximum current comparator threshold. This value is set when the inductor current exceeds the threshold of the current comparator (i.e., $V_{SENSE}$ exceeds the voltage across resistor 118) for more than one oscillator cycle. The current comparator responds by providing a continuous reset signal to latch 106 that overrides the set input signal provided by the oscillator. This prevents main switch MOSFET 110 from turning ON, which causes the regulator to skip oscillator cycles. The loop (resistor divider 122, error amplifier 124, compensation components 126 and 128, and converter circuitry 130, 132, and 134) continues to cause cycles to be skipped until the inductor current falls below the maximum current comparator threshold. The ability to regulate current under short circuit conditions is an important advantage of current-mode switching regulators.

A disadvantage of regulator 100 is that current sense resistor 102 causes additional dissipative losses in the regulator, thus reducing operating efficiency (which is the ratio of power provided by the regulator to the power provided to the regulator, a ratio of 1 being ideal). A further disadvantage is that, to prevent the dissipative losses from becoming excessive, the sense resistor must be a very low value—typically in the range of 0.01 to 0.1 ohms. Such low value resistors are more difficult to manufacture than higher value resistors, resulting therefore in significantly higher manufacturing costs. Moreover, the sense resistor is physically large and requires valuable printed circuit board area, which in portable product designs is often limited.

Examples of current-mode synchronous switching regulators that employ current sense resistors are the Linear Technology LTC1148 and LTC1435, sold by Linear Technology Corporation, of Milpitas, Calif., and the Maxim MAX797, sold by Maxim Integrated Products, Inc., of Sunnyvale, Calif.

An alternative to current-mode operation is voltage-mode operation. Voltage-mode operation provides current limiting capabilities for short circuit protection by measuring the voltage drop across the conducting main switching element, which for MOSFET switches is known as "$V_{DS}$ sensing." Such circuits do not otherwise require current sensing. For example, a voltage-mode switching regulator does not require current sensing during normal operation, because voltage-mode operation typically relies on only the output voltage to set the duty cycle. FIG. 2 shows a prior art voltage-mode synchronous switching regulator 200 that uses $V_{DS}$ sensing for short circuit protection.

Regulator 200 operates typically as follows: main switch MOSFET 202 and synchronous switch MOSFET 204 are coupled in series and to drivers 206 and 208, respectively. Inverter 210 ensures that MOSFET 204 is OFF when MOSFET 202 is ON and vice versa. During normal operation, only one parameter, output voltage $V_{OUT}$, is used to set the regulator's duty cycle. This is accomplished by pulse-width-modulator 212, which varies the pulse width of output signal 214 in response to $V_{OUT}$.

If $V_{OUT}$ becomes low, such as during an output short circuit, pulse-width-modulator 212 normally responds by extending ON-portion 215 of signal 214 to its maximum value, the full period of signal 214. This causes the current flowing through MOSFET 202 and inductor 216 to increase without limit until failure. To prevent such failure, a fault loop is provided that includes AND gate 220, comparator 222, and threshold voltage 224. Thus if the drain-to-source voltage of MOSFET 202 exceeds threshold voltage 224 while MOSFET 202 is ON, a fault signal is sent to pulse-width-modulator 212 that responds by reducing ON-portion 215 of signal 214 to limit the amount of current to non-destructive levels. AND gate 220, which receives a second input from driver 206, ensures that the large $V_{DS}$ of MOSFET 202 is not misinterpreted as a fault when MOSFET 202 is OFF.

One disadvantage of regulator 200 is the compromised protection provided by $V_{DS}$ sensing. This protection is compromised because an accurate measurement of inductor current can only be made while main switch 202 is ON, but the extremely low duty cycles required to control the current during severe faults results in main switch 202 being OFF for substantially all of the cycle. Thus the time available to measure $V_{DS}$ approaches zero during short circuit conditions. Regulating short circuit current is therefore extremely difficult and often requires a complete shutdown to protect the regulator from destruction. Furthermore, additional means are required to resume normal operation after the short circuit is removed.

Examples of voltage-mode switching regulators that employ $V_{DS}$ sensing for short circuit protection are the LTC1430, sold by Linear Technology Corporation, and the Siliconix Si9150, sold by Siliconix Incorporated, of Santa Clara, Calif.

In view of the foregoing, it would be desirable to provide current-mode synchronous switching regulator circuits with improved current control, more efficient operation, and reduced manufacturing costs without employing a current sensing element.

It would also be desirable to provide both current-mode and voltage-mode synchronous switching regulator circuits with improved short circuit protection, more efficient operation, and reduced manufacturing costs without employing a current sensing element.

SUMMARY OF THE INVENTION

It is an object of this invention to provide current-mode synchronous switching regulator circuits with improved current control, more efficient operation, and reduced manufacturing costs without employing a current sensing element.

It is also an object of this invention to provide both current-mode and voltage-mode synchronous switching regulator circuits with improved short circuit protection, more efficient operation, and reduced manufacturing costs without employing a current sensing element.

In accordance with this invention, a synchronous switching regulator circuit employing voltage-drop sensing is provided. The regulator circuit includes an input terminal for coupling to a source of input supply voltage, an output terminal for coupling to a load, and output circuitry for supplying current to the load. The output circuitry is coupled to the input and output terminals and includes an inductor, a main switching element that causes current in the inductor to increase, and a synchronous switching element that conducts inductor current when the main switching element is non-conductive. The synchronous switching element is coupled to voltage-drop sensing circuitry, which measures the voltage drop across the synchronous switching element to generate current information. The voltage-drop sensing circuitry then provides that current information to control circuitry, which varies the regulator's duty cycle, if necessary, in response thereto.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides synchronous switching regulators that employ voltage-drop sensing circuitry to provide current information for controlling the duty cycle of the regulator. These regulators do not require a current sensing element, which is typically a resistor coupled in series with a load. The elimination of a current sensing element results advantageously in reduced dissipative losses and manufacturing complexity.

In a current-mode embodiment, the sensing circuitry senses the voltage drops across both the regulator's main and synchronous switching elements as each in turn conducts (i.e., are ON). The sensed voltage drops are then combined and converted into an analog waveform indicative of the inductor current. The waveform is then provided to control circuitry that responds by varying the ON-OFF states of the switching elements (i.e., the duty cycle of the regulator, which is the percentage of time that a switch is ON during a cycle of operation), thus regulating the amount of current supplied to a load.

In a voltage-mode embodiment, sensing circuitry senses the voltage drop across the synchronous switching element as it conducts. When the sensed voltage drop exceeds a predetermined threshold, control circuitry reduces the regulator's duty cycle (i.e., keeps the main switching element OFF) to limit current while the output voltage is out of regulation.

Figure 3:
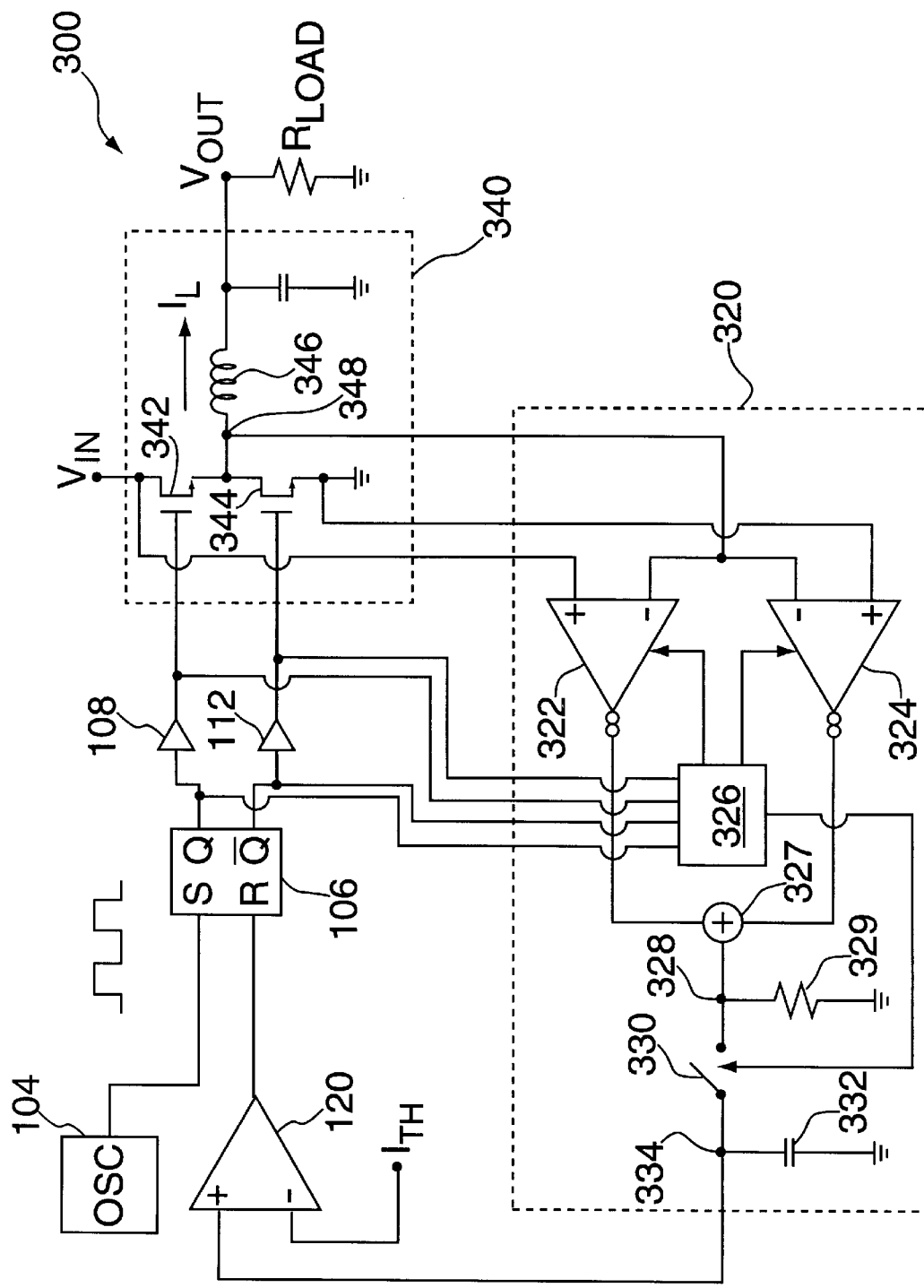
FIG. 3 is a schematic block diagram of an exemplary embodiment of a current-mode synchronous switching regulator circuit according to the present invention.

In accordance with the present invention, an exemplary embodiment of a current-mode synchronous step-down switching regulator circuit 300 employing voltage-drop sensing circuitry is shown in FIG. 3. Regulator 300 can be used, for example, to convert an unregulated DC supply voltage $V_{IN}$ to a regulated DC output voltage $V_{OUT}$, for driving a load $R_{LOAD}$, which, while simply shown as a resistor, may be, for example, a computer or a cordless telephone.

Figure 4:
FIG. 4 is a general illustration of the switch-voltage waveform of the circuit of FIG. 3.

Regulator 300 includes $V_{DS}$ sensing circuitry 320, output circuitry 340, and control circuitry that can include, for example, oscillator 104, current comparator 120, latch 106, and drivers 108 and 112. Output circuitry 340 includes inductor 346 and two serially coupled switching elements, main switch MOSFET 342 and synchronous switch MOSFET 344. These switching elements are driven out of phase with respect to each other to supply current at a regulated voltage to a load. FIG. 4 shows a waveform of regulator switch-voltage 400 taken at node 348 of FIG. 3.

Figure 1:
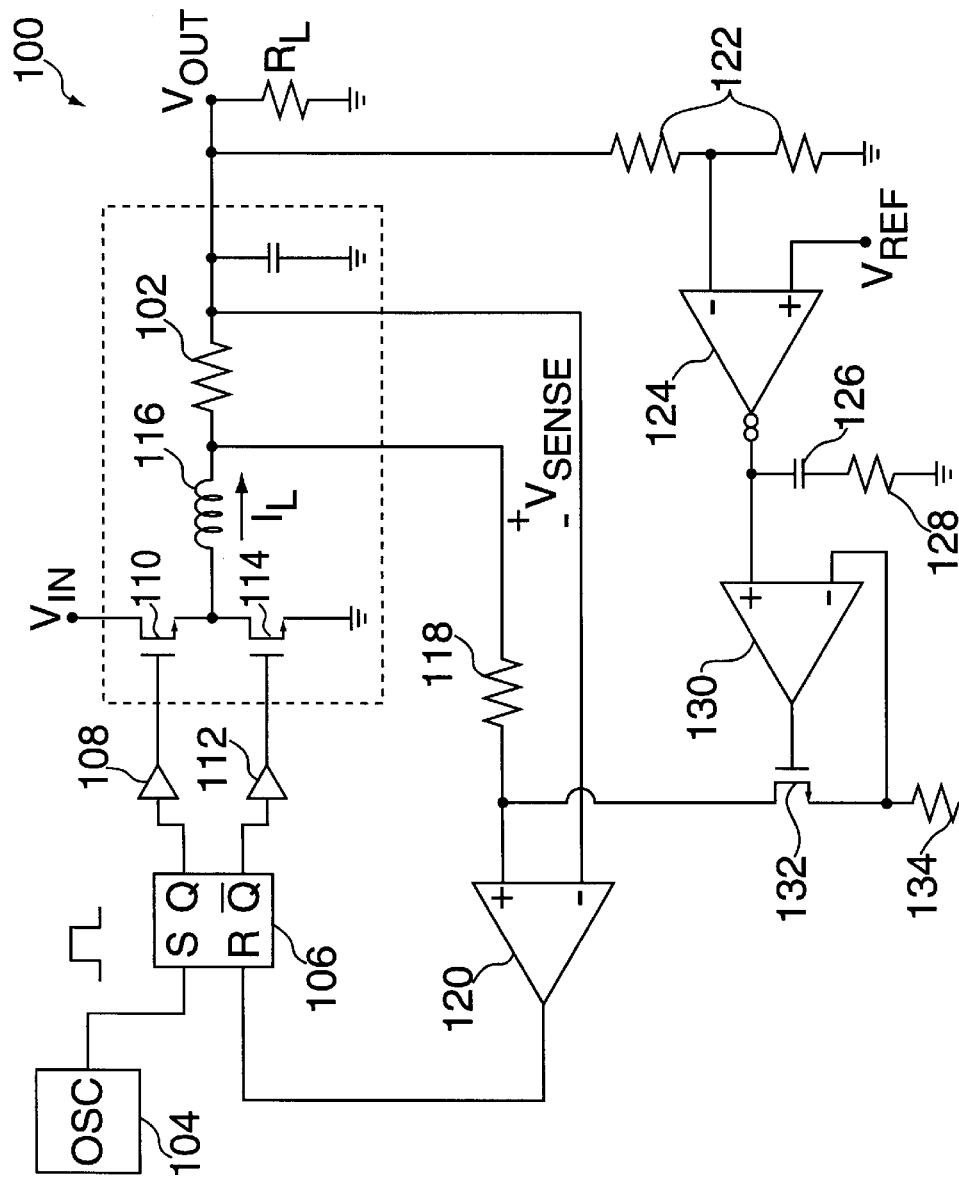
FIG. 1 is a schematic block diagram of a prior art current-mode synchronous switching regulator circuit.

While regulator 300 is similar to regulator 100 of FIG. 1, differences include the absence of a current sensing element (e.g., current sense resistor 102) and the manner in which inductor current is sensed in regulator 300. While regulator 100 relies on measuring the voltage across a current sense resistor, regulator 300 employs $V_{DS}$ sensing circuitry 320 to derive an analog waveform indicative of inductor current from the combined drain-to-source voltage drop measurements of the two MOSFET switching elements, taken as each in turn conducts. $V_{DS}$ sensing circuitry 320 eliminates the need for a current sensing element and thus provides regulator 300 with the advantages of current-mode operation without the disadvantages of a current sense element, particularly additional dissipative losses and a more costly manufacturing process.

Figure 5:
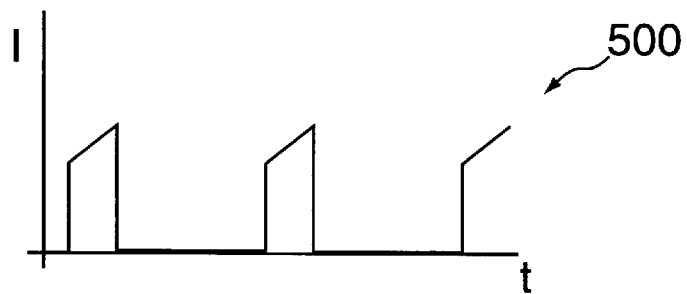
FIG. 5 is a general illustration of an analog waveform of the inductor current derived from voltage-drop sensing of the main switching element of the circuit of FIG. 3.
Figure 6:
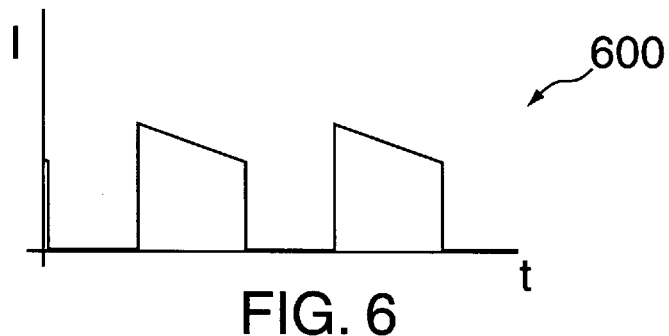
FIG. 6 is a general illustration of an analog waveform of the inductor current derived from voltage-drop sensing of the synchronous switching element of the circuit of FIG. 3.

$V_{DS}$ sensing circuitry 320 operates generally as follows: when main switch MOSFET 342 is ON, it has a drain-to-source voltage drop $V_{DS(342)}$ equal to the product of inductor current $I_L$ and the ON resistance of MOSFET 342 ($R_{DS(ON)}$ (342)). By measuring $V_{DS(342)}$ of conducting MOSFET 342, sense amplifier 322 provides an analog waveform of $I_L$ related to $V_{DS(342)}$ by the constant $R_{DS(ON)}$ (342). This waveform, indicated by reference numeral 500, is shown in FIG. 5. When MOSFET 342 turns OFF and synchronous switch MOSFET 344 turns ON, MOSFET 344 has a negative $V_{DS(344)}$ equal to the product of $I_L$ and $R_{DS(ON)}$ (344). This permits $I_L$ to be sensed during the conduction of MOSFET 344 by measuring $V_{DS(344)}$ with sense amplifier 324, which then provides an analog waveform of $I_L$ related to $V_{DS(344)}$ by the constant $-R_{DS(ON)}$ (344). This waveform, indicated by reference numeral 600, is shown in FIG. 6. Sense amplifiers 322 and 324 can also provide gain to amplify the analog inductor current waveforms.

Figure 2:
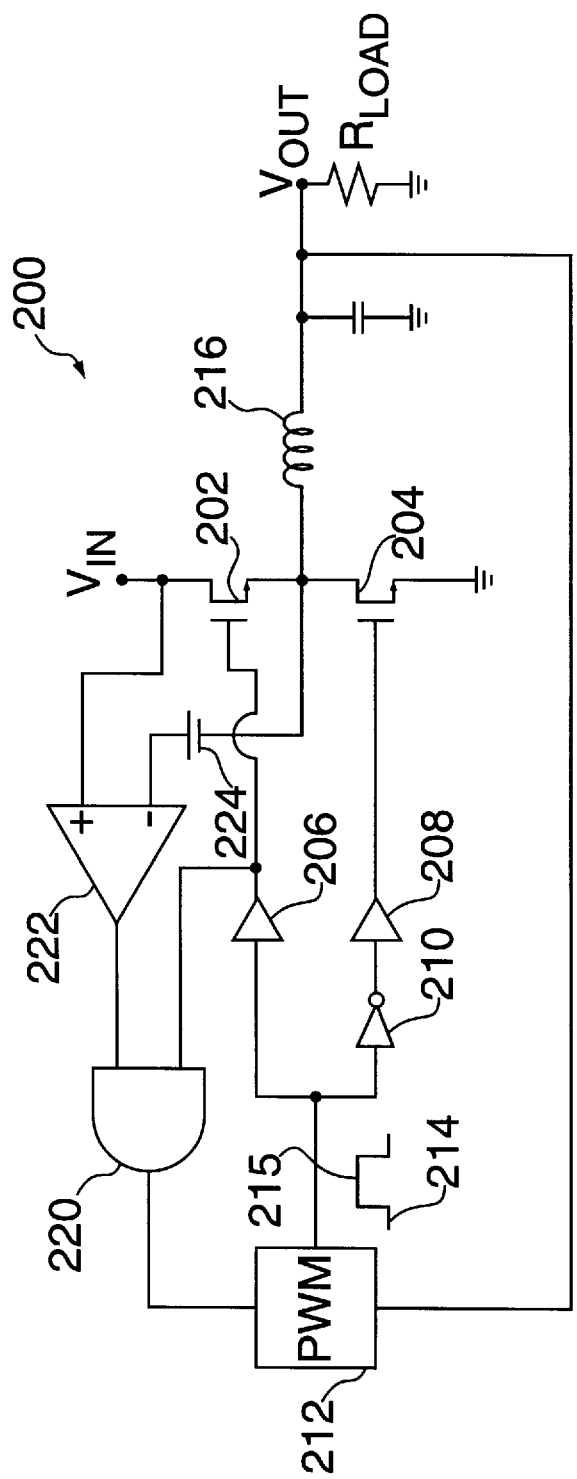
FIG. 2 is a schematic block diagram of a prior art voltage-mode synchronous switching regulator circuit.

As in regulator 200 of FIG. 2, the drain-to-source voltages only provide valid current information while the MOSFETs are ON. For example, during conduction of MOSFET 342, no valid information about $I_L$ is provided by $V_{DS(344)}$, because MOSFET 344 is OFF. Similarly, during conduction of MOSFET 344, no valid information about $I_L$ is provided by $V_{DS(342)}$, because MOSFET 342 is OFF. In the time interval between the conduction of MOSFETs 342 and 344, neither $V_{DS}$ measurement provides valid information about $I_L$, because both switches are OFF. During that time interval, blanking circuitry 326 (included as part of sensing circuitry 320) provides blanking signals to sense amplifiers 322 and 324 to disable their outputs.

Blanking circuitry 326, which is known in the art, is controlled by the inputs and outputs of drivers 108 and 112. For example, sense amplifier 322 is immediately disabled upon receipt of a driver 108 input signal that turns MOSFET 342 OFF. Sense amplifier 322 is re-enabled by a driver 108 output signal after that signal has turned MOSFET 342 ON. Similarly, sense amplifier 324 is immediately disabled upon receipt of a driver 112 input signal that turns MOSFET 344 OFF, and is re-enabled by a driver 112 output signal after that signal has turned MOSFET 344 ON.

Figure 7:
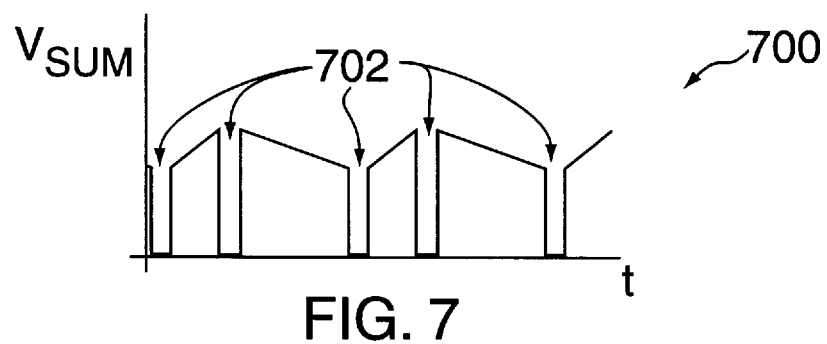
FIG. 7 is a general illustration of the summation signal waveform of the circuit of FIG. 3.

The output waveforms of sense amplifiers 322 and 324 (signals 500 and 600 as shown in FIGS. 5 and 6, respectively) are fed to summation circuitry 327, which combines the two signals and outputs a single waveform at output 328, shown as summation signal 700 in FIG. 7. Preferably, sense amplifiers 322 and 324 are transconductance amplifiers that output current. Summation circuitry 327 is then merely the connection of the two outputs to common resistor 329. Thus when sense amplifier 322 or 324 is enabled (i.e., its output is not blanked), the output current develops an output voltage across resistor 329 at node 328. Alternatively, if the outputs of sense amplifiers 322 and 324 were voltages, summation circuitry 327 may be an op-amp circuit (known in the art and not shown) that combines the individual output voltages.

Figure 8:
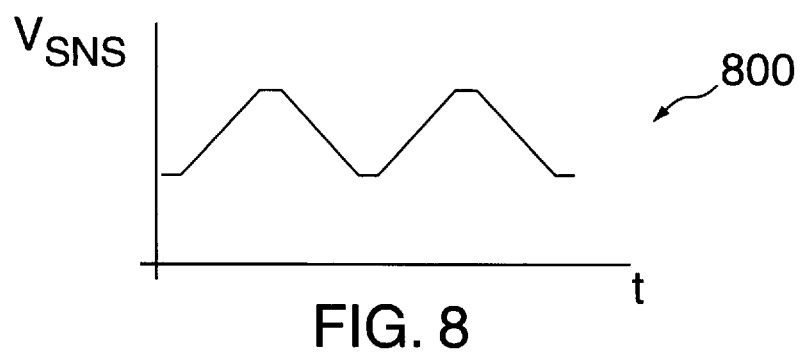
FIG. 8 is a general illustration of the sense signal waveform of the circuit of FIG. 3.

The blanking of sense amplifiers 322 and 324 creates holes 702 in the waveform of summation signal 700. Holes 702 encompass the time intervals when both MOSFETs are OFF. To provide a smooth waveform to current comparator 120, holes 702 are filled at the peaks and troughs of waveform 700 by track-and-hold circuitry comprising switch 330 and capacitor 332. This circuitry holds the signal level that existed immediately prior to each blanking interval. After the blanking interval has ended, the output at node 334, shown as sense signal 800 in FIG. 8, is allowed to resume tracking of summation signal 700.

Sense signal 800 is thus the reconstructed analog of the inductor current and is fed to current comparator 120. While the peak and trough hold-intervals represent lost information about the inductor current, this information is not necessary for proper operation of the regulator. Current comparator 120 determines when to turn OFF main switch MOSFET 342 during the rising portion of sense signal 800 and not during the peak hold-interval. Similarly, current comparator 120 determines whether oscillator 104 is allowed to turn ON main switch MOSFET 342 (i.e., whether sense signal 800 has fallen below the current comparator threshold $I_{TH}$ before the next oscillator pulse) during the falling portion of sense signal 800 and not during the trough hold-interval.

As in regulator 200, a severe fault in regulator 300 may result in such a low duty cycle that the ON-time of MOSFET 342 is too short to obtain a valid $V_{DS}$ measurement. However, unlike regulator 200, $V_{DS}$ sensing circuitry 320 also senses the voltage drop of the synchronous MOSFET, in this case MOSFET 344, which is ON when MOSFET 342 is OFF. Thus the current sense information available from MOSFET 344 trips comparator 120, causing comparator 120 to feed a continuous reset signal to latch 106. This overrides latch 106's set input which prevents main switch MOSFET 342 from turning ON, resulting in skipped cycles. Inductor current is then kept under control until the fault is corrected.

Figure 9:
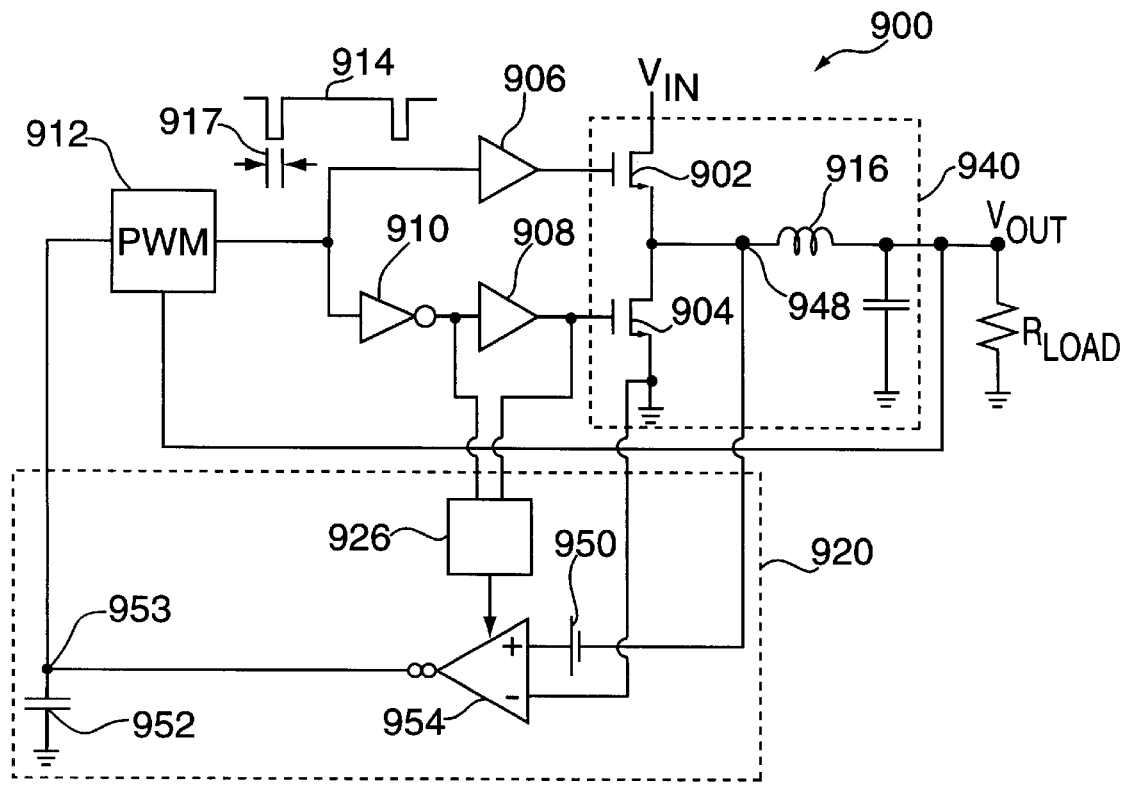
FIG. 9 is a schematic block diagram of an exemplary embodiment of a voltage-mode synchronous switching regulator circuit according to the present invention.

An exemplary embodiment of a voltage-mode synchronous switching regulator 900 employing voltage-drop sensing across the synchronous switch MOSFET in accordance with this invention is shown in FIG. 9. Because voltage-mode regulators are more susceptible to line and load transient signals than current-mode regulators, regulator 900 is advantageously used in applications which, for example, have a relatively constant input voltage (e.g., a 12 volt or 5 volt supply) and a relatively constant load current.

Regulator 900 includes synchronous switch $V_{DS}$ sensing circuitry 920, output circuitry 940, and control circuitry that includes pulse-width-modulator 912 and drivers 906 and 908. While regulator 900 is similar to regulator 200 of FIG. 2, differences include $V_{DS}$ sensing of the synchronous switch MOSFET instead of the main switch MOSFET, and the limiting of the maximum duty cycle of the regulator to a predetermined value less than 100% in regulator 900.

As in regulator 200, main switch MOSFET 902 and synchronous switch MOSFET 904 are driven by drivers 906 and 908, respectively, with inverter 910 ensuring that MOSFET 904 is OFF when MOSFET 902 is ON, and vice versa. Pulse-width-modulator 912 sets the regulator's duty cycle based on output voltage $V_{OUT}$, with the limitation that the duty cycle cannot be greater than a predetermined value, such as, for example, 90%. Thus the OFF-portion 917 of main switch MOSFET waveform 914 cannot be less than the difference between 100% and the predetermined maximum duty cycle (e.g., 10% for a 90% duty cycle).

Limiting the maximum duty cycle ensures that driver 908 turns ON synchronous switch MOSFET 904 for at least a portion of each cycle, thus permitting $V_{DS}$ sensing circuitry 920 to obtain inductor current information. While such maximum duty cycle limitations may cause a step-down switching regulator to begin losing regulation slightly earlier as input voltage $V_{IN}$ is reduced, there are no other undesirable operating effects on the regulator. Furthermore, if such a duty cycle limitation is unacceptable, it can be removed by combining the main switch MOSFET $V_{DS}$ sensing of regulator 200 with the synchronous switch MOSFET $V_{DS}$ sensing of regulator 900. The regulator therefore retains the advantage of improved short circuit protection without restricting its maximum duty cycle.

$V_{DS}$ sensing circuitry 920 includes comparator 954, threshold voltage 950, blanking circuitry 926, and filter capacitor 952. The operation of comparator 954 and blanking circuitry 926 is similar to that of comparator 222 (of FIG. 2) and blanking circuitry 326 (of FIG. 3).

Figure 10:
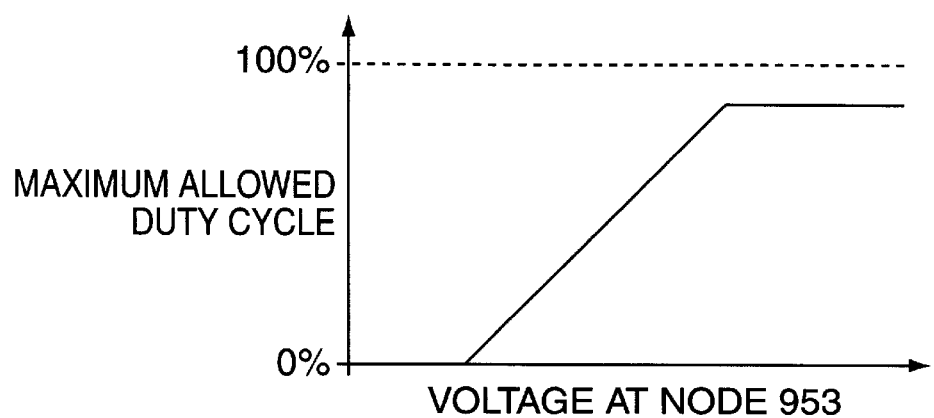
FIG. 10 is a general illustration of the duty cycle of the circuit of FIG. 9.

Blanking circuitry 926 enables comparator 954 to monitor $V_{DS(904)}$ while synchronous switch MOSFET 904 is ON. If the inductor current causes $V_{DS(904)}$ to exceed threshold voltage 950, comparator 954 sinks current from filter capacitor 952 to cause the voltage at node 953, and, accordingly, the maximum allowed duty cycle (as shown in FIG. 10), to decrease.

If $V_{OUT}$ becomes low, such as during an output short circuit, pulse-width-modulator 912 normally responds by extending the duty cycle to its maximum value, which, for example, may be 95%. During the complementary 5% of the cycle, $V_{DS}$ sensing circuitry 920 detects the increased inductor current and responds by reducing the duty cycle of main switch MOSFET 902, thus increasing the conduction time of synchronous switch MOSFET 904. During a potentially severe fault, which results in main switch MOSFET 902 being OFF for substantially all of the cycle, accurate current sense information is still available from MOSFET 904. Similar to the operation of current-mode regulator 300, voltage-mode regulator 900 skips cycles as necessary to keep the inductor current under control (i.e., the voltage at node 953 is pulled down to a zero duty cycle as shown in FIG. 10).

Regulators 300 and 900 therefore retain the advantages of regulating short circuit current, while avoiding both the disadvantages of invalid current information during low duty cycles as in regulator 200 and the disadvantages of a current sensing element as in regulator 100.

Furthermore, even though regulators 300 and 900 are shown in a step-down configuration, the principles of the present invention can be applied to other synchronous regulator configurations, such as boost or buck-boost configurations, which are known in the art. The principles of the present invention can also be applied to other types of switching elements, such as, for example, bipolar transistors, where collector-to-emitter voltage drops are measured.

In addition, the track-and-hold function of regulator 300 can be incorporated into sense amplifiers 322 and 324, thus allowing summation signal 700 to be applied directly to current comparator 120. Also, the gain of one or both current sense amplifiers can be adjusted to compensate for switching MOSFETs having mismatched $R_{DS(ON)}$s.

Thus it is seen that synchronous switching regulators with improved current control, more efficient operation, and lower manufacturing costs are provided. Persons skilled in the art will appreciate that the present invention can be practiced by other than the described embodiments, which are presented for purposes of illustration and not of limitation, and the present invention is limited only by the claims which follow.

What is claimed is:

1. A synchronous switching regulator circuit for supplying current at a regulated voltage to a load, said regulator circuit comprising:

an input terminal for coupling to a source of input supply voltage;

an output terminal for coupling to said load;

control circuitry for regulating the duty cycle of said regulator circuit;

output circuitry coupled to said input terminal, to said output terminal, and to said control circuitry, said output circuitry comprising an inductor, a main switching element that causes current in said inductor to increase, and a synchronous switching element that conducts said inductor current when said main switching element is non-conductive; and voltage-drop sensing circuitry coupled to said synchronous switching element and to said control circuitry for providing current information to said control circuitry when said synchronous switching element is conductive.

2. The regulator circuit of claim 1 wherein said voltage-drop sensing circuitry comprises:

a sense amplifier coupled to said output circuitry; and blanking circuitry coupled to said sense amplifier and to said control circuitry.

3. The regulator circuit of claim 1 wherein said regulator circuit operates in current-mode.

4. The regulator circuit of claim 3 wherein said voltage-drop sensing circuitry is also coupled to said main switching element.

5. The regulator circuit of claim 4 wherein said voltage-drop sensing circuitry comprises:

first and second sense amplifiers coupled to said output circuitry;

blanking circuitry coupled to said first and second sense amplifiers and to said control circuitry; and summation circuitry coupled to the outputs of said first and second sense amplifiers and to said control circuitry.

6. The regulator circuit of claim 5 wherein said voltage-drop sensing circuitry further comprises track-and-hold circuitry coupled to said summation circuitry and to said control circuitry.

7. The regulator circuit of claim 6 wherein said track-and-hold circuitry comprises:

a switch coupled in series to said summation circuitry and to said control circuitry; and a capacitor coupled between said switch and said control circuitry to ground.

8. The regulator circuit of claim 5 wherein said first and second sense amplifiers each comprises track-and-hold circuitry.

9. The regulator circuit of claim 5 wherein said first and second sense amplifiers each provides gain.

10. The regulator circuit of claim 5 wherein said main and synchronous switching elements each comprise MOSFETs having mismatched $R_{DS(ON)}$s, and at least one of said first and second sense amplifiers provides a gain that can compensate for said mismatched $R_{DS(ON)}$s.

11. The regulator circuit of claim 3 wherein said control circuitry comprises:

an oscillator;

a latch coupled to said oscillator and to said output circuitry; and a current comparator coupled to said latch and to said voltage-drop sensing circuitry.

12. The regulator circuit of claim 1 wherein said regulator circuit operates in voltage-mode.

13. The regulator circuit of claim 12 wherein the maximum duty cycle of said regulator circuit is less than 100% to permit valid voltage-drop sensing of said synchronous switching element during each cycle.

14. The regulator circuit of claim 12 wherein said voltage-drop sensing circuitry comprises:

a comparator coupled to said synchronous switching element and to said control circuitry; and blanking circuitry coupled to said control circuitry and to said comparator.

15. The regulator circuit of claim 12 wherein said control circuitry comprises:

a pulse-width-modulator coupled to said voltage-drop sensing circuitry and to said output terminal; and a plurality of drivers coupled to said pulse-width-modulator and to said output circuitry.

16. The regulator circuit of claim 12 wherein said synchronous switching element comprises a MOSFET.

17. The regulator circuit of claim 12 wherein said synchronous switching element comprises a bipolar transistor.

18. The regulator circuit of claim 1 wherein said main and synchronous switching elements comprise MOSFETs.

19. The regulator circuit of claim 1 wherein said main and synchronous switching elements comprise bipolar transistors.

20. The regulator circuit of claim 1 wherein said regulator circuit is in a step-down configuration.

21. The regulator circuit of claim 1 wherein said regulator circuit is in a boost configuration.

22. The regulator circuit of claim 1 wherein said regulator circuit is in a buck-boost configuration.

23. A method of regulating current supplied to a load by a synchronous switching regulator, said regulator comprising control circuitry for controlling the regulator's duty cycle, output circuitry coupled to said control circuitry and to said load, said output circuitry comprising an inductor, a main switching element that causes current in said inductor to increase, a synchronous switching element that conducts said inductor current when said main switching element is non-conductive, and voltage-drop sensing circuitry coupled to said synchronous switching element and to said control circuitry, said method comprising the steps of:

sensing the voltage drop across said synchronous switching element when said synchronous switching element is conductive;

deriving current information from said sensing; and varying said duty cycle in response to said current information.

24. The method of claim 23 wherein said step of sensing further comprises the step of:

inhibiting said sensing step when said synchronous switching element is non-conducting.

25. The method of claim 24 wherein said synchronous switching element is conducting during at least a portion of each cycle.

26. The method of claim 23 wherein said step of sensing further comprises the steps of:

sensing the voltage drop across said main switching element; and summing said sensed voltage drops of said main and synchronous switching elements.

27. The method of claim 26 wherein said step of sensing the voltage drop across said main switching element further comprises the step of:

inhibiting said sensing of said main switching element voltage drop when said main switching element is non-conducting.

28. The method of claim 26 wherein said step of deriving comprises the steps of:

deriving an analog signal waveform indicative of said current; and smoothening said current analog signal waveform.

29. A method of protecting a synchronous switching regulator from damage when a fault occurs, said regulator providing current to a load and comprising control circuitry for controlling the regulator's duty cycle, output circuitry coupled to said control circuitry and to said load, said output circuitry comprising an inductor, a main switching element that causes current in said inductor to increase, a synchronous switching element that conducts said inductor current when said main switching element is non-conductive, and voltage-drop sensing circuitry coupled to said synchronous switching element and to said control circuitry, said method comprising the steps of:

sensing the voltage drop across said synchronous switching element when said synchronous switching element is conductive;

deriving a signal from said sensing indicative of an amount of current being supplied by said regulator; and reducing the duty cycle of said regulator if said signal exceeds a threshold.

30. The method of claim 29 further comprising the step of:

skipping cycles of said regulator until said threshold is no longer exceeded.

* * * * *